April 3, 1945.  A. ROBERTSON  2,372,683
WIRE SUPPORTING CLIP
Filed Nov. 23, 1943
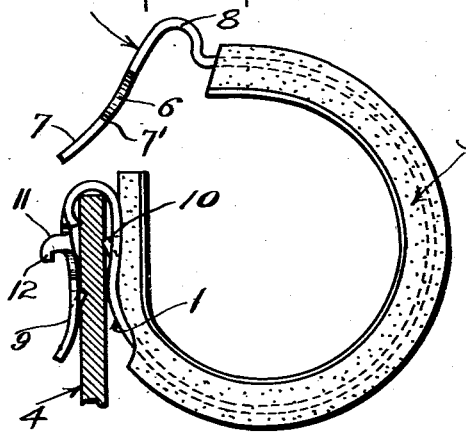
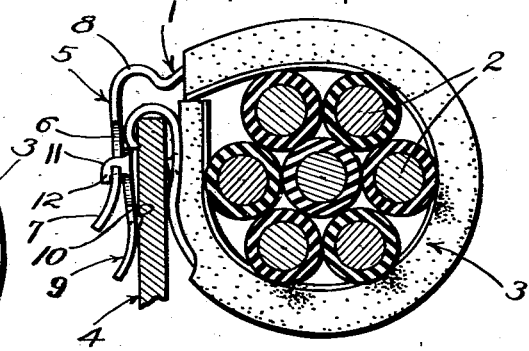
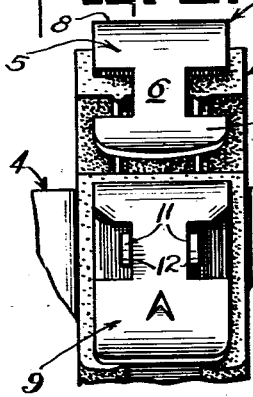
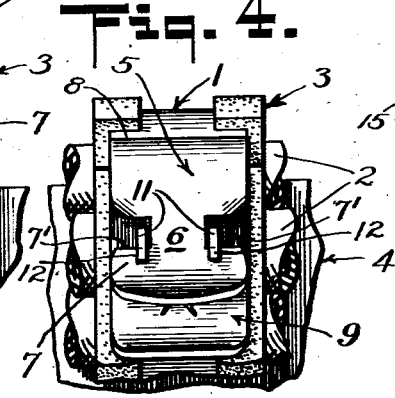
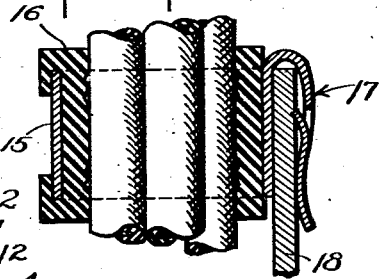
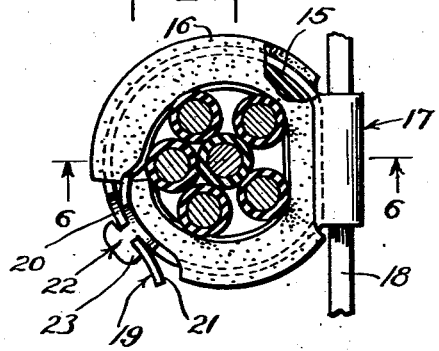
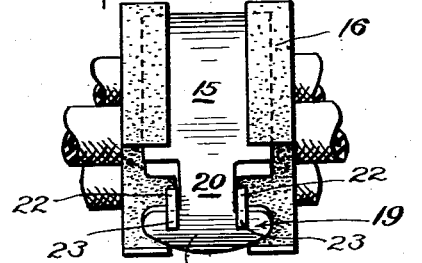
Inventor
ARCHIBALD ROBERTSON
By
Attorney Patented Apr. 3, 1945

2,372,683

UNITED STATES PATENT OFFICE 2,372,683

WIRE SUPPORTING CLIP

Archibald Robertson, North Hollywood, Calif., assignor to Adel Precision Products Corp., a corporation of California Application November 23, 1943, Serial No. 511,491

7 Claims. (Cl. 248—74)

This invention relates to clips of the type employed to support groups of electrical conductor wires or the like at closely spaced intervals throughout the extent thereof in aircraft in order to securely hold such wires in the desired position and safeguard against derangement and wear resulting from vibration of the aircraft.

An object of my invention is to provide a clip of the character described which may be quickly and easily installed without the use of tools and screws, nuts, bolts and other extraneous fastening elements, due to the provision of a novel fastening means embodied in the clip itself and which may be quickly and easily manipulated to clamp the clip around the wires and as easily released to permit of opening of the clip for removal or insertion of a wire or the group thereof.

Another object is to provide a clip such as described which embodies a depressible locking tongue on one end of a resilient wire-embracing band forming the body of the clip, and locking elements on the other end of said band in an arrangement such that on overlapping said ends and depressing the tongue into engagement with said locking elements as may be readily accomplished with the fingers, the band will be locked in closed position around the wires with the locking means subject to a quick and easy release to permit of opening the band.

A further object is to provide a self-locking clip of the character described which in one form has the locking means in part embodied in a novel manner in an end extension of the clip in the form of a clasp designed to secure the clip to a structural part of the aircraft without the use of tools or extraneous fastenings.

Another object is to provide a clip of the character described which is tensioned and so arranged that forces tending to expand or open the clip cause the locking members to be more securely interlocked and held in locking position.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a side elevation of a clip embodying my invention as when installed on a structural part of the aircraft and before the placing of the wires therein;

Fig. 2 is a side elevation similar to Fig. 1 showing the clip completely installed with the wires held therein;

Fig. 3 is a front elevation of the clip as shown in Fig. 1;

Fig. 4 is a front elevation of the clip as shown in Fig. 2;

Fig. 5 is a fragmentary side elevation of a modified form of the invention;

Fig. 6 is a horizontal sectional view taken on the line 6—6 of Fig. 5;

Fig. 7 is a front elevation of the clip shown in Fig. 5.

Referring to the drawing more specifically, it is seen that a wire supporting clip embodying my invention includes a wire-embracing loop or band 1 formed of a resilient metal strap so that its ends are subject to being sprung apart to open the band as shown in Fig. 1, then brought together to close the band around a group of wires 2 as shown in Fig. 2, with the group of wires seated on a cushion strip 3 of yieldable elastic rubber or synthetic rubber lining said band to dampen vibration and prevent wear of the wires.

The clip hereof may be clamped around the wires before being mounted on a structural part of the aircraft such as the part 4 here shown, or first fastened to said part and then clamped around the wires, and in all forms embodies a means for locking the clip closed around the wires, or in other words, for locking the clip on the wires, also a means for mounting the clip on a structural part of the aircraft, both of which means will be hereinafter more fully described.

Considering the means for locking the clip around the wires, it is seen that in the form of the invention shown in Figs. 1 to 4 inclusive that one end of the band 1 is outwardly offset and extended from the band proper in the form of a locking tongue 5 which has notches or recesses in opposite side edges that define a narrow neck portion 6, and a T-shaped head portion 7, this entire tongue being flexible or depressible relative to the wire-embracing portion of the band so that it may be flexed toward and away from the other end of the band while the wires are contained in the band as well as when the wires are removed therefrom. The flexibility of the tongue 5 is increased by reason of the looped or curved bend 8 joining the tongue to the band proper and also serving to offset the tongue outwardly.

The other end of the band 1 is bent back on itself to form an inverted U-shaped clasp adapted to be clipped over an edge of the structural part 4 as the means aforementioned for quickly and easily detachably mounting the clip on the aircraft. The clasp 9 will have a tensioned contact with opposite sides of the supporting structure, thereby frictionally holding the clip in place. This holding action is increased by means of spurs 10 struck out from opposite sides of the clasp so as to bite into the structural part as shown in Figs. 1 and 2.

Locking means are provided on the outer leg of the clasp 9 in the form of spaced lugs 11 struck outwardly and provided with hook ends 12, said lugs consisting of out-bent parts of the band which have edge portions so contoured as to produce the hooks. The neck portion 6 of the tongue 5 is depressed to lie between the lugs 11 so that the hook ends 12 will engage the outer side of the T-head 7 and the shoulders 7' formed by said head on opposite sides of the neck portion. Figs. 2 and 4 show how the head portion 7 and the hook ends 12 are engaged to lock the band in closed position and clamped around the group of wires 2, it being noted that the band and locking elements are so tensioned and constructed that forces tending to spread the ends apart and open the clip cause the hook ends 12 and the head 7 to be tightly forced together thereby more securely locking the clip against inadvertent opening.

It is now apparent that the clip may be locked in closed position around the wires with one hand since it is only necessary to force the ends of the band together then depress the tongue 5 between the lugs 11 until the head 7 is spaced inwardly of the bills of the hook ends 12. On releasing the tongue 5 following depression thereof to lock it in place, the ends of the band tend to spring apart and this causes the head 7 to hook and lock under the hook ends 12 and the parts to assume the position shown in Figs. 2 and 4. The arrangement is such that the clip may be locked around the wires before or after being mounted on the structural part 4.

To release the locking means and open the clip it is only necessary to depress the outer end (head 7) of the tongue 5 and at the same time push said head slightly in a direction away from the lugs 11, whereupon the ends of the band will spring apart and the band will be opened as shown in Figs. 1 and 3.

A modified form of my invention as shown in Figs. 5, 6 and 7, includes a resilient band 15 and cushion 16 corresponding to the band and cushion of the form of my invention shown in Figs. 1 to 4 inclusive. This modified form differs from the first described clip in that it has a mounting clasp 17 formed to extend transversely and intermediate the ends of the band so that the clip may be mounted on a supporting part 18 as shown in Figs. 5 and 6. Moreover, the ends of the band are not bent back on themselves as in the first described form. Instead, one end of the band is extended as a locking tongue 19 having the neck 20 and T-head 21 as in the tongue 5 and adapted to be depressed between locking lugs 22 struck out from the other end of the band. The lugs 22 have hook ends 23 which lock with the head 21 in the same manner as in the first described form of my invention.

It is now seen that both forms of my invention have the same novel locking means and that the main difference is that the modified form has the mounting clasp formed at a point remote from the locking means as shown in Fig. 5 rather than at the ends of the band in combination with the locking means as shown in Fig. 1.

While I have shown and described specific embodiments of my invention, I do not limit myself to the exact details of construction set forth, and the invention embraces such changes, modifications and equivalents of the parts and their formation and arrangement as come within the purview of the appended claims.

I claim:

1. In a supporting clip for a group of wires, a resilient wire-embracing band having ends subject to being sprung apart to open the band and adapted to be brought together to clamp the band around the wires, a locking tongue on one of said ends adapted to be brought into overlying relation to and depressed toward the other of said ends and having notches in opposite edges thereof forming a neck portion intermediate the ends of the tongue and a head at the outer end of said tongue; and hook-like locking lugs on said other end spaced apart to receive said neck portion therebetween and having portions adapted to hook over said head when said tongue is depressed to bring the head under said bill portion.

2. In a supporting clip for a group of wires, a resilient wire-embracing band having ends subject to being sprung apart to open the band and brought together to close the band around the wires, a locking tongue on one of said ends adapted to be depressed against the other of said ends; and outwardly extending lugs on said other end spaced apart to receive said tongue therebetween and having hook ends adapted to hook over portions of said tongue to lock said ends together.

3. In a wire supporting clip, a resilient, split, wire-embracing band tensioned so that the ends are normally apart and subject to being moved together to close and clamp the band around the wires to be supported, a pair of locking lugs on one of said ends having hook portions, a locking tongue on the other of said ends adapted to be flexed and depressed between said lugs; and locking portions on said tongue which are engaged under said hook ends and are forced thereagainst by the tension of said band to releasably lock the band in closed position around the wires, said lugs consisting of out-bent parts of the band having edge portions which are so contoured as to produce the hooks.

4. In a supporting clip for a group of wires, a resilient wire-embracing band having ends subject to being sprung apart to open the band and brought together to close the band around the wires, a locking tongue on one of said ends adapted to overlap and subject to depression toward the other of said ends, locking means on said other end for engaging and locking said tongue in overlapped relation to said other end upon the depression of said tongue into engagement with said locking means; and an inverted U-shaped mounting clasp formed by bending said other end back on itself outside the band, said locking means being carried on the outer face of said bent back portion of said other end.

5. In a supporting clip for a group of wires, a resilient wire-embracing band having ends subject to being sprung apart to open the band and brought together to close the band around the wires, a locking tongue extending from one of said ends, a loop portion joining said tongue to said one end and disposing said tongue in outwardly offset relation to the band proper and subject to being moved into overlapping relation to and flexed and depressed toward the other of said ends, the other of said ends being bent back on itself outside said band to form with the band a clasp for mounting the band on a support; and locking means on said bent back portion operating to have a tensioned locking engagement with said tongue upon depression of the tongue over said bent back portion into predetermined relation to said locking means.

6. In a supporting clip for a group of wires, a resilient wire-embracing band having ends subject to being sprung apart to open the band and brought together to close the band around the wires, a locking tongue extending from one of said ends, a loop portion joining said tongue to said one end and disposing said tongue in outwardly offset relation to the band proper and subject to being moved into overlapping relation to and flexed and depressed toward the other of said ends, the other of said ends being bent back on itself outside said band to form with the band a clasp for mounting the band on a support; and locking means on said bent back portion operating to have a tensioned locking engagement with said tongue upon depression of the tongue over said bent back portion into predetermined relation to said locking means, said locking means including lugs extending outwardly from said bent back end and hooks on the outer ends of said lugs for overlying portions of said tongue.

7. In a supporting clip for a group of wires, a resilient wire-embracing band having ends subject to being sprung apart to open the band and brought together to close the band around the wires, a locking tongue extending from one of said ends, a loop portion joining said tongue to said one end and disposing said tongue in outwardly offset relation to the band proper and subject to being moved into overlapping relation to and flexed and depressed toward the other of said ends, the other of said ends being bent back on itself outside said band to form with the band a clasp for mounting the band on a support; and locking means on said bent back portion operating to have a tensioned locking engagement with said tongue upon depression of the tongue over said bent back portion into predetermined relation to said locking means, said locking means including lugs extending outwardly from said bent back end and hooks on the outer ends of said lugs for overlying portions of said tongue, said tongue being T-shaped with the shank of the T adapted to be disposed between said lugs and the head of the T lying under said hooks.

ARCHIBALD ROBERTSON.